US010942818B1

(12) United States Patent
Bhange et al.

(10) Patent No.: US 10,942,818 B1
(45) Date of Patent: Mar. 9, 2021

(54) COMMON BACKUP AND RECOVERY SOLUTION FOR DIVERSE CLOUD-BASED SERVICES IN A PRODUCTIVITY SUITE

(71) Applicant: Quest Software Inc., Aliso Viejo, CA (US)

(72) Inventors: Himanshu Bhange, Maharashtra (IN); Lakshmikant Keskar, Cupertino, CA (US)

(73) Assignee: Quest Software Inc., Aliso Viejo, CA (US)

( * ) Notice: Subject to any disclaimer, the term of this patent is extended or adjusted under 35 U.S.C. 154(b) by 0 days.

(21) Appl. No.: 16/547,365

(22) Filed: Aug. 21, 2019

(51) Int. Cl.
*G06F 11/14* (2006.01)
*G06F 3/06* (2006.01)

(52) U.S. Cl.
CPC .......... *G06F 11/1464* (2013.01); *G06F 3/067* (2013.01); *G06F 3/0617* (2013.01); *G06F 3/0619* (2013.01); *G06F 3/0653* (2013.01); *G06F 11/1469* (2013.01); *G06F 11/1448* (2013.01); *G06F 11/1451* (2013.01)

(58) Field of Classification Search
CPC ............. G06F 11/1448; G06F 11/1451; G06F 11/1458; G06F 11/1464; G06F 3/067
USPC ....................................................... 711/162
See application file for complete search history.

(56) References Cited

U.S. PATENT DOCUMENTS

| 9,800,647 | B1 * | 10/2017 | Kruck | ................. H04L 41/0806 |
| 2013/0097320 | A1 * | 4/2013 | Ritter | .................... G06Q 10/06 709/226 |
| 2015/0212889 | A1 * | 7/2015 | Amarendran | ....... G06F 11/1448 707/674 |
| 2019/0278748 | A1 * | 9/2019 | Amarendran | ....... G06F 11/2094 |

\* cited by examiner

*Primary Examiner* — Than Nguyen
(74) *Attorney, Agent, or Firm* — Kirton McConkie; Brian Tucker

(57) ABSTRACT

A common backup and recovery solution is provided for diverse cloud-based services in a productivity suite. The common backup and recovery solution can be configured to interface with an API platform that is associated with the productivity suite to thereby retrieve text-based data that identifies content of the diverse cloud-based services. The common backup and recovery solution can create a backup of the content by storing the text-based data. The common backup and recovery solution can also employ the text-based data to identify and obtain files that form part of the content and then store the files as part of the backup with the text-based data. To perform a recovery, the common backup and recovery solution can employ the text-based data of the backup and content of the files in the backup to send requests to the API platform that will cause the content to be restored.

20 Claims, 11 Drawing Sheets

COMMON BACKUP AND RECOVERY SOLUTION FOR DIVERSE CLOUD-BASED SERVICES IN A PRODUCTIVITY SUITE

CROSS-REFERENCE TO RELATED APPLICATIONS

N/A

BACKGROUND

Office 365 is a Microsoft subscription-based productivity suite that includes a number of cloud-based services (or applications) such as Exchange, Outlook, OneDrive, SharePoint, OneNote, etc. Although there are backup and recovery solutions for individual cloud-based services in Office 365, no single backup or recovery solution exists that can be used with each of the various cloud-based services. For example, Microsoft provides Exchange Web Services (EWS) which is an application programming interface (API) that provides access to mailbox content (e.g., emails, contacts, calendars, etc.) stored in Exchange. Although EWS could be used to perform backup and recovery of an Exchange mailbox, it cannot be used with any other cloud-based service in Office 365.

Increasingly more businesses are moving towards productivity suites, such as Office 365, that provide cloud-based services as opposed to the traditional local installation of equivalent applications. With this move towards cloud-based services, there is currently a lack of adequate backup and recovery solutions for a business's needs. For example, if a business employs Office 365's Exchange and Outlook cloud-based services to provide email, OneDrive for document storage and SharePoint for collaboration, the business would likely need to rely on Microsoft's retention policies alone (which are typically one month) for backup and recovery of its OneDrive and SharePoint content and would only have access to a backup and recovery solution for its email content (e.g., via EWS). In short, there is no common backup and recovery solution that can be used with each of Office 365's cloud-based services or each of the cloud-based services of any other similar productivity suite.

BRIEF SUMMARY

The present invention extends to methods, systems, and computer program products for providing a common backup and recovery solution for diverse cloud-based services in a productivity suite. The common backup and recovery solution can be configured to interface with an API platform that is associated with the productivity suite to thereby retrieve text-based data that identifies content of the diverse cloud-based services. The common backup and recovery solution can create a backup of the content by storing the text-based data. The common backup and recovery solution can also employ the text-based data to identify and obtain files that form part of the content and then store the files as part of the backup with the text-based data. To perform a recovery, the common backup and recovery solution can employ the text-based data of the backup and content of the files in the backup to send requests to the API platform that will cause the content to be restored.

In some embodiments, the present invention is implemented as a method for performing a backup of content stored in diverse cloud-based services using a common technique. One or more backup requests can be received which indicate that content of two or more diverse cloud-based services of a productivity suite should be backed up. In response to the one or more backup requests, application programming interface (API) requests can be created and sent to an API platform associated with the productivity suite. In response to the API requests, text-based data that identifies the content of the two or more diverse cloud-based services can be received. A backup of the content of the two or more diverse cloud-based services can then be created by storing the text-based data on one or more backup storage devices.

In other embodiments, the present invention is implemented as computer storage media storing computer executable instructions which when executed implement a backup and recovery solution. This solution can be configured to backup content stored in diverse cloud-based services using a common technique by performing the following steps: receiving one or more backup requests to backup content of a cloud-based hosted email platform and content of a cloud-based storage platform; creating and sending a first set of API requests to an API platform, the first set of API requests being configured to retrieve emails from the cloud-based hosted email platform; creating and sending a second set of API requests to the API platform, the second set of API requests being configured to retrieve files from the cloud-based storage platform; in response to the first set of API requests, receiving a first set of text-based data that identifies the emails; in response to the second set of API requests, receiving a second set of text-based data that identifies the files; employing the second set of text-based data to obtain the files; and creating a backup by storing the first set of text-based data, the second set of text-based data and the files on one or more backup storage devices.

In other embodiments, the present invention is implemented as a method for performing a backup of content stored in diverse cloud-based services using a common technique. In response to determining that a backup of content of two or more diverse cloud-based services of a productivity suite should be performed, a first set of API requests can be created and sent to an API platform associated with the productivity suite. In response to sending the first set of API requests, a set of text-based data can be received where the text-based data identifies the content of the two or more diverse cloud-based services. Information contained in the set of text-based data can then be employed to obtain files that are maintained by at least one of the two or more diverse cloud-based services. A backup of the content of the two or more diverse cloud-based services can then be created by storing the set of text-based data and the files on one or more backup storage devices.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "productivity suite" should be construed as a collection of diverse cloud-based services that users may employ to create, manage and/or store content. Microsoft's Office 365 is one example of a productivity suite. In the context of the present invention, the term "identity service" should be construed as a service that authenticates a requester for the purpose of authorizing access to a productivity suite and that provides evidence of the authentication (e.g., an access token) to enable the requester to access one or more cloud-based services in the productivity suite.

In this description and the claims, a distinction is made between "text-based data" and "files." The term "text-based data" will be used as a general term for a tenant's content, other than files, in a cloud-based service that is accessible via the Microsoft Graph API platform. Currently, such text-based data is formatted as key/value pairs in accordance with JavaScript Object Notation (JSON). In contrast, the term "file" will be used to represent the files that are stored in OneDrive, files that are shared in SharePoint, possibly attachments to emails, events, etc. Accordingly, the text-based data can be viewed as encompassing metadata that describes files but does not encompass the files themselves. The term "content" will be used in some cases, but not exclusively, as a general term that may encompass either or both the text-based data and the files.

The term "JSON-formatted data" and its variants should be construed as text-based data that is formatted in accordance with JSON or that is formatted in accordance with any other equivalent data-interchange format (e.g., XML). Accordingly, even though JSON will be used in examples throughout the description, the present invention should not be limited to implementations where JSON is used as the format for the text-based data.

Figure 1:
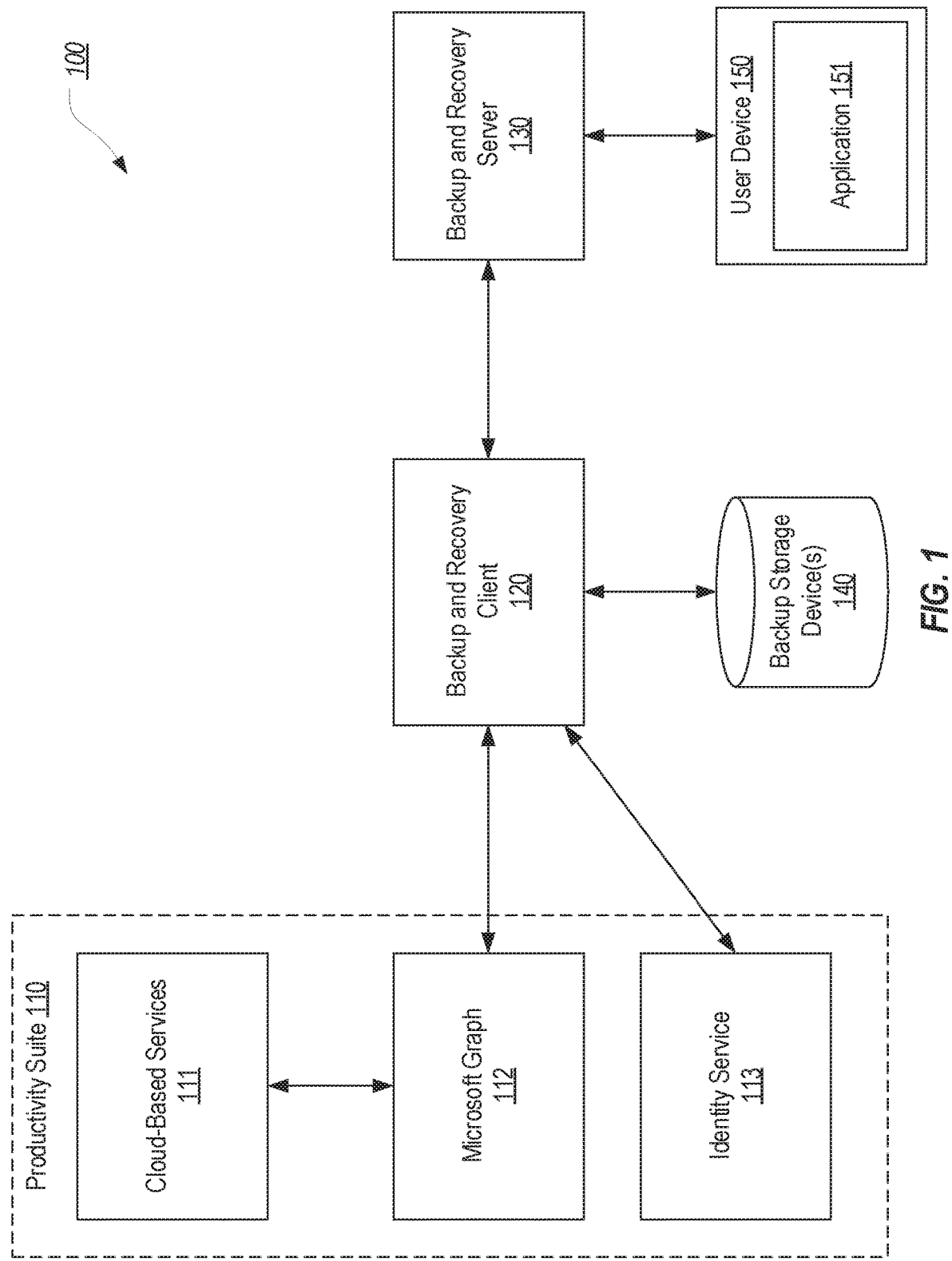
FIG. 1 illustrates an example computing environment in which embodiments of the present invention can be implemented.

FIG. 1 illustrates an example computing environment 100 in which embodiments of the present invention can be implemented. Environment 100 includes a productivity suite 110 having multiple diverse cloud-based services 111. In some embodiments, these diverse cloud-based services 111 may include a hosted email platform (e.g., Exchange), a hosted storage platform (e.g., OneDrive), a hosted collaboration platform (e.g., SharePoint), a hosted personal information manager (e.g., Outlook) and various hosted applications (e.g., Word, Excel, PowerPoint, etc.) among possibly many other services. FIG. 1 also shows that productivity suite 110 includes, or is otherwise integrated or associated with, the Microsoft Graph API platform 112 and an identity service 113 (e.g., Azure Active Directory).

Environment 100 also includes a backup and recovery client 120 (e.g., Quest Software's NetVault Client) and a backup and recovery server 130 (e.g., Quest Software's NetVault Server). Both backup and recovery client 120 and backup and recovery server 130 can be implemented on any type of machine, whether physical or virtual. For example, either or both of backup and recovery client 120 and backup and recovery server 130 could be implemented on an on-premises device or hosted in the cloud, including in a hosted storage platform of productivity suite 110. The present invention should therefore not be limited to any particular physical or logical architecture in which backup and recovery client 120 and backup and recovery server 130 are implemented.

Environment 100 also includes one or more backup storage devices 140 which can represent any of the many different types of storage devices and/or storage techniques that may be available to backup and recovery client 120. For example, backup storage devices 140 can represent disk-based storage devices, deduplication appliances, physical tape libraries, autoloaders, tape drives, Virtual Tape Libraries (VTLs), etc. Backup storage devices 140 can also represent network attached storage (NAS), a storage area network (SAN), cloud-based storage (e.g., Azure or AWS storage), etc. The present invention should therefore not be limited to any particular device or location where a backup may be stored.

Environment 100 further includes a user device 150 on which an application 151 may be executed for the purpose of accessing backup and recovery server 130. Application 151 may oftentimes represent a browser by which an administrator may access a website that employs APIs or other web-based functionality for communicating with backup and recovery server 130 (e.g., Quest Software's NetVault Backup WebUI). However, application 151 may equally be a dedicated application. The present invention should therefore not be limited to any particular type of application 151 by which an administrator interfaces with backup and recovery server 130.

In typical, yet non-limiting, implementations, a first entity such as Microsoft would provide productivity suite 110 and a second entity (e.g., Quest Software) would provide backup and recovery client 120, backup and recovery server 130 and application 151 (collectively, the "backup solution"). A third entity (or "tenant") would have a subscription to productivity suite 110 to enable its employees or other types of end users to have accounts with and/or access to cloud-based services 111 which would result in user content (e.g., emails, calendar events, contacts, documents, etc.) being created within these services. This third entity would then employ the backup solution to create backups of the user content on backup storage device(s) 140.

To provide context for embodiments of the present invention, an overview of the general roles of backup and recovery client 120 and backup and recovery server 130 will be given. In typical implementations, a single backup and recovery server 130 will be used and will function to manage the overall backup and recovery process including to interface with the administrator(s). In contrast, one or more backup and recovery clients 120 can be used to perform the bulk of the actual backup and restore functionality. An administrator can employ application 151 to interact with backup and recovery server 130. These interactions may include monitoring the status of backup and recovery server 130, monitoring the progress or status of any active backup or restore jobs, monitoring the activity of backup storage device(s) 140, creating/scheduling new backup or restore jobs, viewing reports, managing, adding or removing a backup and recovery client 120 or backup storage device 140, etc. Of primary relevance to the present invention, an administrator can employ application 151 to create, schedule and/or modify backup and restore "jobs" pertaining to content in the diverse cloud-based services 111 of productivity suite 110. As described below, backup and recovery client 120 can be configured in a way that enables the content from these diverse cloud-based services 111 to be backed up and restored using a common technique. As a result, an entity can employ the same backup and recovery solution for all of its content in productivity suite 110 even though this content spans a diverse array of cloud-based services.

Figure 2:
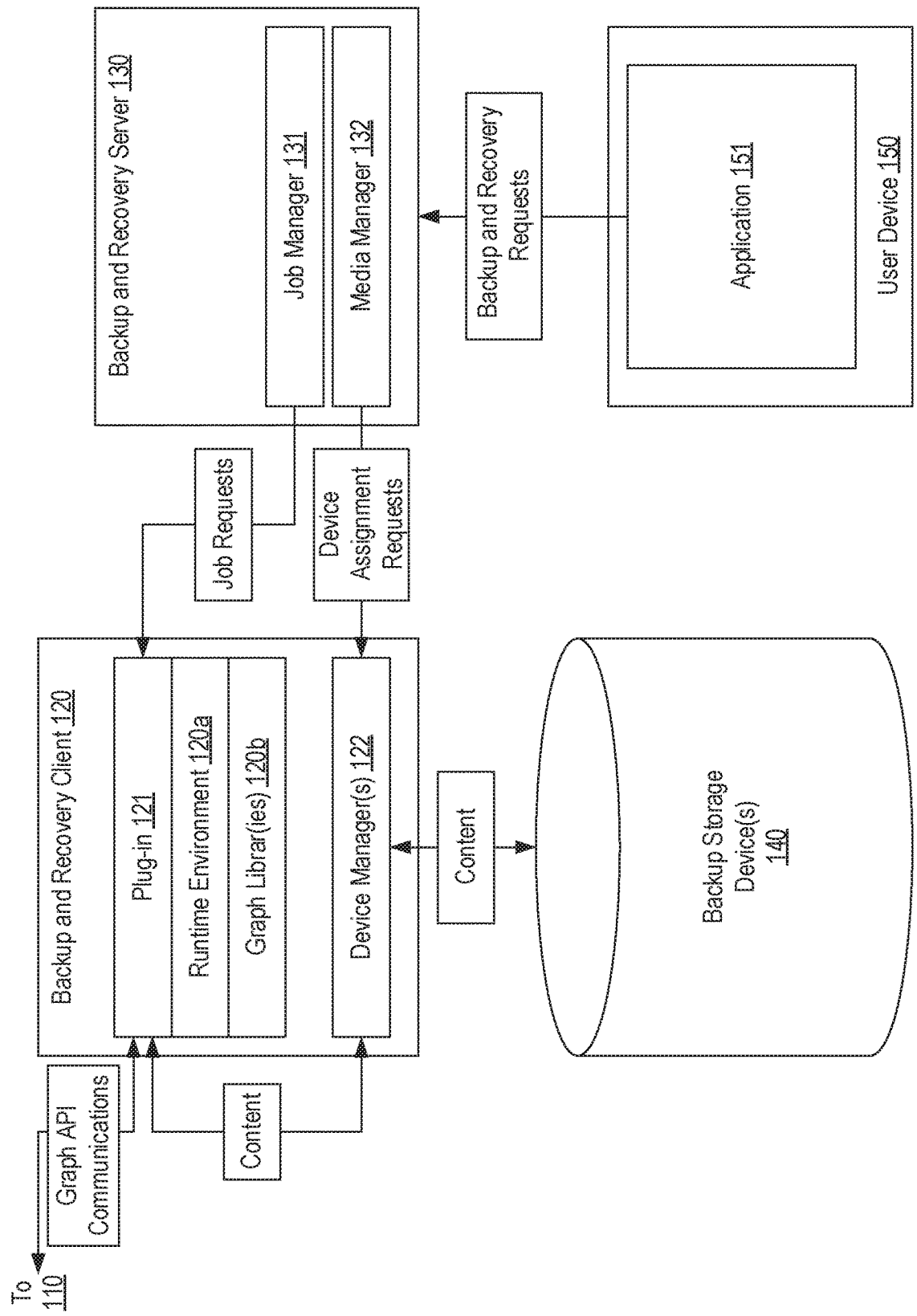
FIG. 2 illustrates various components that may be employed in the example computing environment to implement embodiments of the present invention.

FIG. 2 provides a more detailed illustration of how backup and recovery client 120 can be configured to implement this common backup and recovery solution. As shown, backup and recovery client 120 includes (among possibly many other components that are not depicted) a plug-in 121 which represents the components (e.g., software) that execute on backup and recovery client 120 and which are configured to interface with productivity suite 110. The term "plug-in" signifies that many types of plug-ins exist, each of which can be used to perform backup and recovery of content in other environments. Plug-in 121 represents a plug-in of the backup and recovery solution that is specifically configured for use in environment 100 (e.g., that is specifically configured to interface with the Microsoft Graph API platform 112).

In some embodiments, plug-in 121 can be implemented so that it is compatible with a runtime environment 120*a*. When backup and recovery client 120 employs the Windows operating system, runtime environment 120*a* may be the Common Language Runtime. However, runtime environment 120*a* could represent any common language infrastructure. In other embodiments, plug-in 121 could be implemented as native code that does not employ a runtime environment. The use of runtime environment 120*a* should therefore be viewed as one suitable example only. FIG. 2 also shows that plug-in 121 may employ Graph library(ies) 120*b* which may represent the Microsoft Graph SDK. The Microsoft Graph SDK provides a number of libraries that can be used to build and submit Microsoft Graph API requests. In other embodiments, plug-in 121 may directly build and submit Microsoft Graph API requests in which case graph librar(ies) 120*b* may not be necessary. The use of Graph librar(ies) 120*b* should therefore be viewed as one suitable example only.

Backup and recovery client 120 also includes one or more device managers 122. Each device manager 122 can be configured to interface with one or more different types of backup storage devices 140. For example, backup and recovery client 120 may include a device manager 122 for communicating over a SAN, a device manager 122 for communicating with a particular cloud storage provider, a device manager 122 for communicating with a local storage device, etc. In some embodiments, a single device manager 122 could be configured to communicate with all types of backup storage devices 140. However, employing multiple types of device managers 122 can facilitate scaling.

Backup and recovery server 130 is shown as including a job manager 131 and a media manager 132 (among possibly many other components that are not depicted). Job manager 131 can be viewed as the component(s) on backup and recovery server 130 that communicate job requests to plug-in 121. Similarly, media manager 132 can be viewed as the component(s) on backup and recovery server 130 that communicate device assignment requests to device manager(s) 122. These job requests and device assignment requests can be generated in response to backup and/or recovery requests received from application 151, in response to a schedule, in accordance with a policy, etc.

A backup job request can generally be viewed as information which identifies at least one "backup source." A backup source can be a particular user's account in one or more cloud-based services, the accounts of a particular group of users in one or more cloud-based services, all accounts of a tenant's users in each cloud-based service, etc. Simply put, a backup job request can identify what content is to be backed up. A recovery job request can generally be viewed as information which identifies the content to be recovered or restored (e.g., all content of a backup or portions of a backup). A device assignment request can generally be viewed as information that links a job request to one or more backup storage devices 140. For example, a backup job request can identify the backup source and a corresponding device assignment request can identify where the content from the identified backup source should be stored. The depicted separation of job requests from device assignment requests represents one non-limiting example only.

As an overview, FIG. 2 represents that plug-in 121 responds to a job request by building and transmitting Graph API requests (e.g., by employing Graph librar(ies) 120*b*) that are specifically configured to retrieve content from a particular cloud-based service 111. The content retrieved via the resulting Graph API responses can then be routed to the appropriate device manager 122 which in turn can store the content in the appropriate backup storage device 140.

Figure 3A:
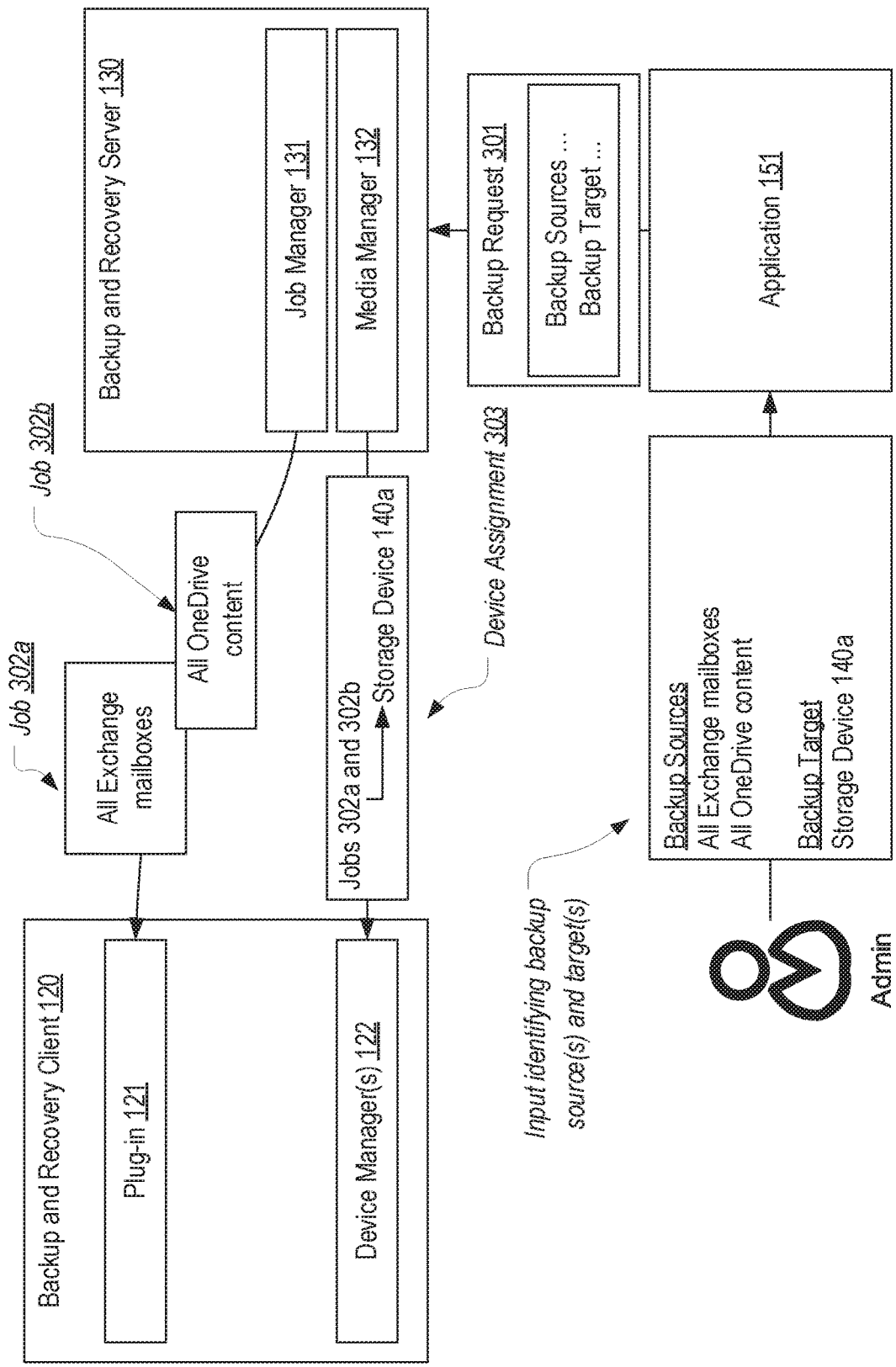
FIGS. 3A-3E illustrate an example of how embodiments of the present invention can perform a backup of content in diverse cloud-based services using a common backup and recovery solution.

FIGS. 3A-3E and the following description provide more detail regarding how, in some embodiments, plug-in 121 can employ Graph API communications in a common manner to backup content from multiple diverse cloud-based services 111 in productivity suite 110. In FIG. 3A, it is assumed that an administrator is interacting with application 151 to request backup of content that exists in two distinct cloud-based services: (1) content in all the Exchange mailboxes of the tenant's users; and (2) all of the tenant's users' content stored in OneDrive. It is also assumed that the administrator would like to backup this content to storage device 140*a*.

In response to the administrator providing this input that identifies the backup sources and target, application 141 can send backup request 301 to backup and recovery server 130. Backup request 301 can identify the backup sources (all Exchange mailboxes and all OneDrive content of the tenant's users) and the backup target (storage device 140*a*) among possibly many other types of information (e.g., a time to perform the backup, a recurrence for the backup, a retention duration, any exclusions, etc.).

In response to backup request 301, job manager 131 can create jobs 302*a* and 302*b*. In this example, it is assumed that a separate job is created for each particular cloud-based service 111 from which content will be backed up. Accordingly, job 302*a* pertains to the content of the Exchange mailboxes while job 302*b* pertains to the OneDrive content. However, in other embodiments, a single job or any number of jobs may be employed for backing up this content. At the appropriate time(s), job manager 131 can send jobs 302*a* and 302*b* to plug-in 121 to initiate the backup of the content. In conjunction with (whether at the same time, before or after) sending jobs 302*a* and 302*b*, media manager 132 can send device assignment 303 to device manager(s) 122 which informs device manager(s) 122 that content obtained when performing jobs 302a and 302b should be stored on storage device 140a.

Figure 3B:
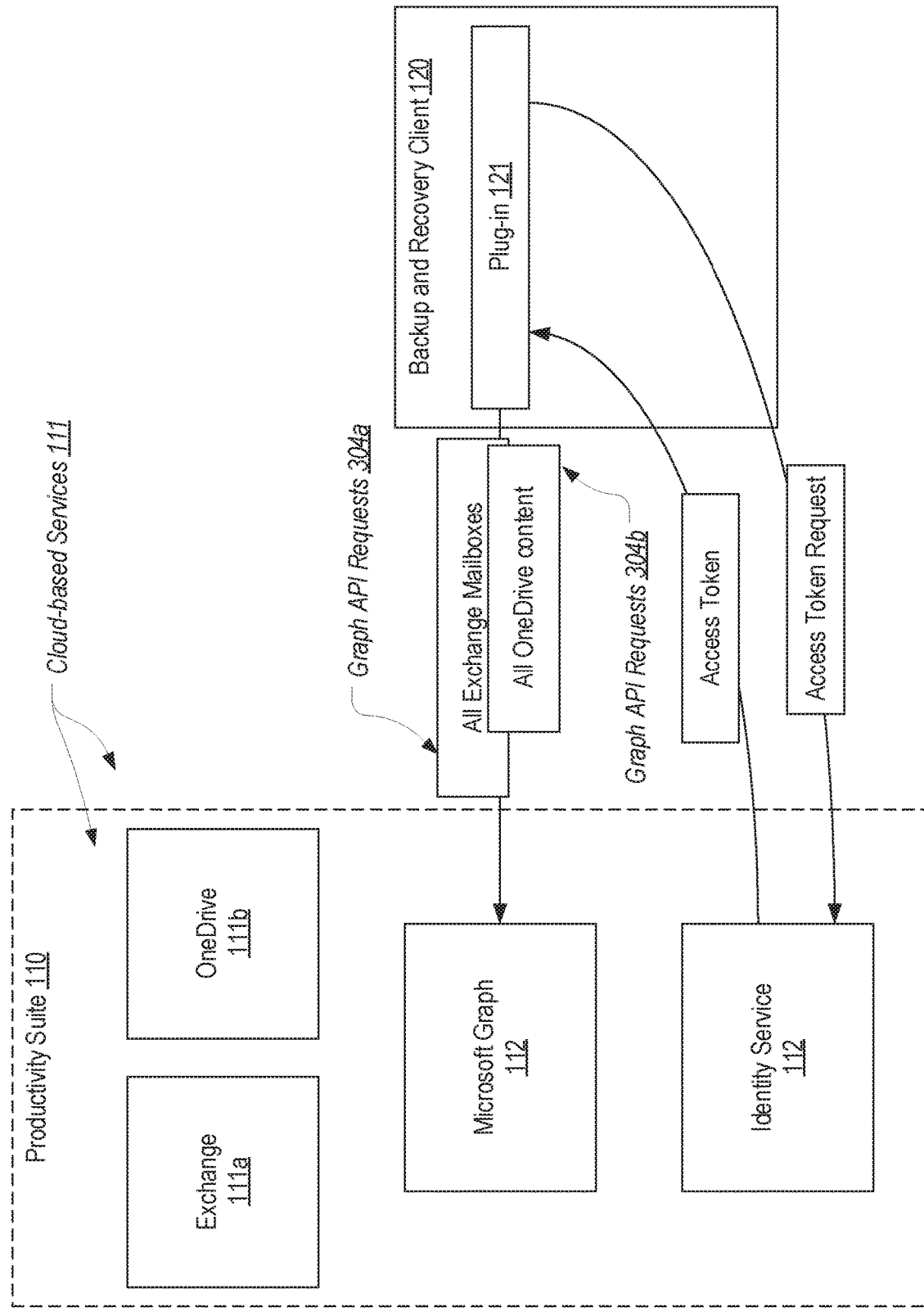

FIG. 3B represents how plug-in 121 can respond to receiving jobs 302a and 302b. Initially, plug-in 121 can submit one or more access token requests (or other authorization requests) to identity service 112. An access token request can typically employ the OAuth 2.0 protocol (or equivalent protocol) to obtain an access token with authentication scope(s) sufficient to enable plug-in 121 to access the content to be backed up. In this example, plug-in 121 can request one or more access tokens that will enable it to access each user's Exchange mailbox and each user's OneDrive account. In typical implementations, plug-in 121 can be registered with identity service 112 for application permissions which enable plug-in 121 to access a user's content without the user being logged in. In such a case, plug-in 121 can directly provide authentication credentials (e.g., a client id and client secret) with an access token request. For purposes of this example, it will be assumed that plug-in 121 obtains a single access token that will authorize it to access each user's Exchange mailbox and each user's OneDrive account. Of course, if plug-in 121 already has a valid token, it may not be necessary to perform this interaction with identity service 112.

Once plug-in 121 has obtained a suitable access token, it can then create and transmit Graph API requests to the Microsoft Graph API platform 112 for accessing and retrieving the content to be backed up. For example, FIG. 3B illustrates that plug-in 121 creates and submits Graph API requests 304a for retrieving the content of the Exchange mailboxes and Graph API requests 304b for retrieving the OneDrive content. In some embodiments, plug-in 121 could employ Graph librar(ies) 120b to create and submit requests 304a and 304b, while in other embodiments, plug-in 121 could directly create and submit these requests.

Figure 3C:
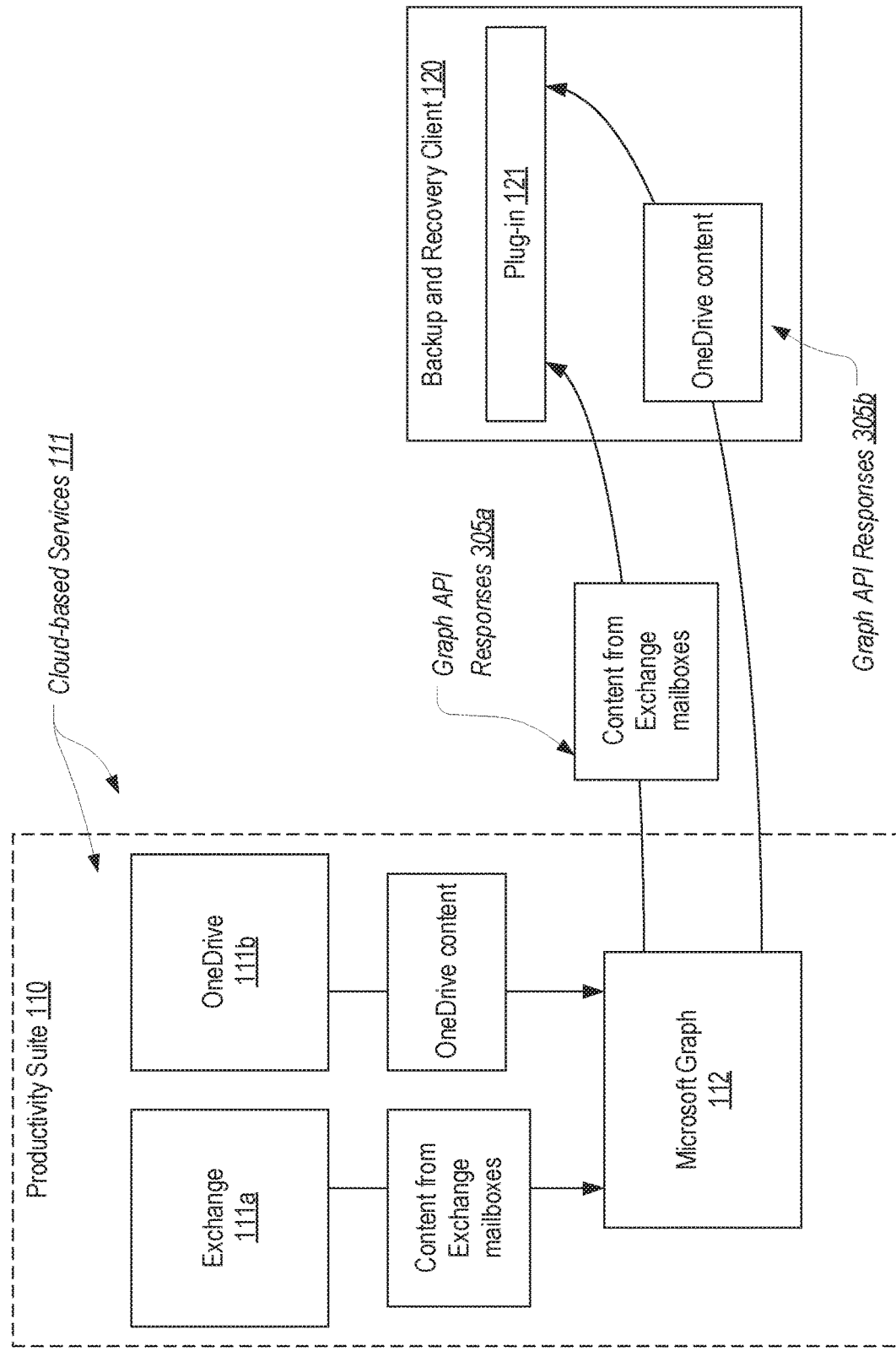

As shown in FIG. 3C, in response to Graph API requests 304a and 304b, the Microsoft Graph API platform 112 will retrieve the requested content from the Exchange mailboxes and the OneDrive content and return such content to plug-in 121 in Graph API responses 305a and 305b respectively. As described below, Graph API requests 304a and 304b and Graph API responses 305a and 305b may include many requests and corresponding responses.

Notably, even though Exchange 111a and OneDrive 111b are distinct cloud-based services, plug-in 121 can use a common technique to retrieve and backup the diverse content (including both text-based data and files) that is maintained by these services. More particularly, Graph API requests 304a and 304b represent a common technique—API requests to the Microsoft Graph API platform 112—for accessing content in Exchange 111a and OneDrive 111b for the purpose of creating a backup of the content. Plug-in 121 could also use similar Graph API requests to retrieve content from other cloud-based services in productivity suite 110 (e.g., content from SharePoint sites, lists, drives, etc.). As described in more detail below, this common technique also extends to the storage of the content. In short, plug-in 121 enables the backup solution to request content from diverse cloud-based services using a common technique (e.g., Graph API requests), receive the content in a common format (e.g., JSON), store the content in the common format and recover the content using the same common technique.

By way of example, to obtain the content of each user's Exchange mailbox, Graph API Requests 304a could include the following request which plug-in 121 can use to obtain an identifier (userPrincipalName) of each of the tenant's users.

GET https://graph.microsoft.com/v1.0/users?$select=userPrincipalName
Authorization: Bearer access_token_id
Host: graph.microsoft.com For brevity, much of the content of subsequent example requests will be omitted. Once plug-in 121 has obtained the identifier of each of the tenant's users, it could submit a sequence of requests to retrieve the content of each user's Exchange mailbox. This may entail requesting all emails within the user's Exchange mailbox or requesting a list of the folders (or mailboxes) in each user's Exchange mailbox and then retrieving the emails from the appropriate mailboxes (e.g., only from mailboxes (e.g., Inbox, Sent Items, etc.) that job 302a identified for backup). In such a case, Graph API requests 304a could include the following requests to obtain emails from the Inbox, Sent Items and Outbox mailboxes of a particular user who is assumed to have an identifier (or userPrincipalName) of user_A@tenant.com:

GET . . . /users/user_A@tenant.com/mailFolders/Inbox/messages
GET . . . /users/user_A@tenant.com/mailFolders/SentItems/messages
GET . . . /users/user_A@tenant.com/mailFolders/Outbox/messages
. . .

As described in more detail below, by sending such requests, plug-in 121 would receive text-based data defining the content, which in this case includes emails, that exists in the user's various mail folders.

To obtain attachments, Graph API requests 304a could include requests similar to the following request where message-id is the identifier of a particular email (i.e., plug-in 121 could submit this request after using the above-requests to identify each email that has one or more attachments).

GET . . . /users/user_A@tenant.com/messages/{message-id}/attachments/

Such a request would return text-based data defining any attachment to the identified email including the bytes of the attachment in the contentBytes key.

Graph API Requests 304a could include a similar set of requests for each of the tenant's users. Graph API Requests 304a could also include similar requests for retrieving each user's calendar events (including attachments), contacts, or any other content that may be stored in or associated with the user's Exchange mailbox.

Also by way of example, to obtain the content of each user's OneDrive, Graph API Requests 304b could include the following requests which represent one technique for retrieving the files stored in the OneDrive of a particular user. With these requests, plug-in 121 first lists the contents (folders and files) in the root of the user's OneDrive and may then proceed to download the files (including traversing each folder and downloading the files in the folder).

GET . . . /users/{user-id}/drive/root/children (enumerates root directory)
GET . . . /users/{user-id}/drive/items/{folder-id}/children (enumerates sub-folder)
GET . . . /users/{user-id}/drive/items/{file-id}/content (downloads file)

As a result of such requests, plug-in 121 would receive text-based data describing the files on the user's OneDrive and would also receive/download the files themselves.

As can be seen, Graph API requests 304a and 304b represent a common technique for requesting the content stored in different cloud-based services. The following simplified examples of corresponding Graph API responses 305a and 305b represent that plug-in 121 receives this content in a common format. It is noted that, in such responses, the @odata.context key provides the context for the content that follows (e.g., the group, user, mailbox, message, folder, etc. to which the content pertains). In response to the request "GET . . . /users/user_A@tenant.com/mailFolders/Inbox/messages," plug-in 121 may receive the following response in JSON format. The headers and much of the body have been removed for brevity.

```
{
  "@odata.context":" .../$metadata#users('user-id')...",
  "value" : [
    {
      "id" : "id1",
      "receivedDateTime": "2019-08-01T06:23:20Z",
      "has Attachments": false,
      "subject": "Project Overview",
      "body" : {
        "contentType" : "html",
        "content" : "<html ...",
      },
      "sender" : {
        "emailAddress" : {
          "address" : user_b@tenant.com"
        }
      }
    }
    {
      "id" : "id2",
      "receivedDateTime": "2019-08-02T09:11:50Z",
      "has Attachments": true,
      "subject": "Your Statement",
      "body" : {
        "contentType" : "html",
        "content" : "<html ...",
      },
      "sender" : {
        "emailAddress" : {
          "address" : billing@company.com"
        }
      }
    }
    ...
```

This example response represents two email messages that exist in User A's inbox (which context would be defined in the @odata.context key), one of which includes an attachment. The response includes both the actual content of the emails (e.g., the HTML that is the value of the "content" key which defines the body of the email) and metadata (e.g., the id, receipt date and time, subject, sender, etc.) all of which is formatted as key/value pairs. In a typical scenario, Graph API responses 305a would include many such JSON-formatted responses (e.g., a JSON-formatted response identifying all emails in a particular user's account). In addition to responses that provide this content of emails, Graph API responses 305a may also include responses that identify and provide the content of attachments. For example, the following response, which identifies the attachment for the email having an id of id2 (which is provided in the value of the @odata.context key) and that provides the bytes of the attachment in the contentBytes propery, could be received.

```
{
  "@odata.context":" . . . /$metadata . . . /messages('id2')/attachments",
  "value": [
    {
      "id": "AttachmentId1",
      "name": "Evaluation.docx",
      "contentType": "application/vnd.openxmlformats-officedocument.wordprocessingml.document",
      "contentBytes": "{bytestream}",
```

. . .

Accordingly, a backup of an Exchange mailbox could include text-based data that is received from the Microsoft Graph API platform 112 and which defines the content of emails, events, contacts, etc. and any accompanying attachments.

With regards to Graph API responses 305b, the "GET . . . /users/{user-id}/drive/root/children" request may provide the following response in JSON format. Again, the headers and much of the body have been removed for brevity.

```
{
  "@odata.context":" .../$metadata#users('user-id')...",
  "value" : [
    {
      "id" : "FolderId1",
      "name": "Estimates",
      "folder" : {
        "childCount" : 3
      }
    }
    {
      "id" : "FileId1",
      "name": "White Paper.docx",
      "webUrl": "https://....",
      "file" : {
        "mimeType": "application/vnd.openxmlformats-officedocument.wordprocessingml.document",
      }
    },
    ...
```

This example response represents a folder and a file that are stored on the user's OneDrive in the root directory. In addition to obtaining this text-based data defining which folders and files are on the user's OneDrive, plug-in 121 can also obtain (i.e., download) the files using the value of the webUrl key or using an appropriate Graph API request (e.g., using the content property in a Graph API request targeting the file). Accordingly, a backup of a OneDrive account could include text-based data that is received from the Microsoft Graph API platform 112 and which identifies the files, folders, etc. stored in the account as well as the files that plug-in 121 can download using the information provided in the text-based data.

Figure 3D:
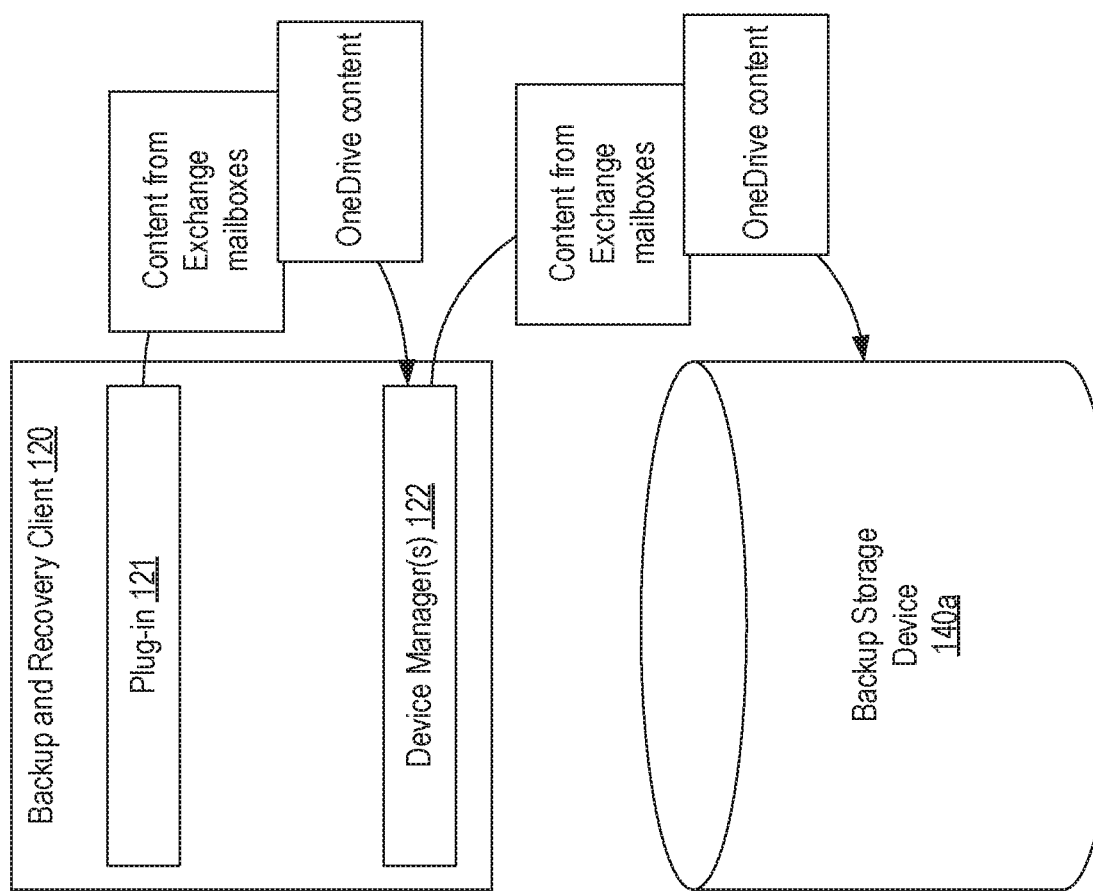
Figure 3E:
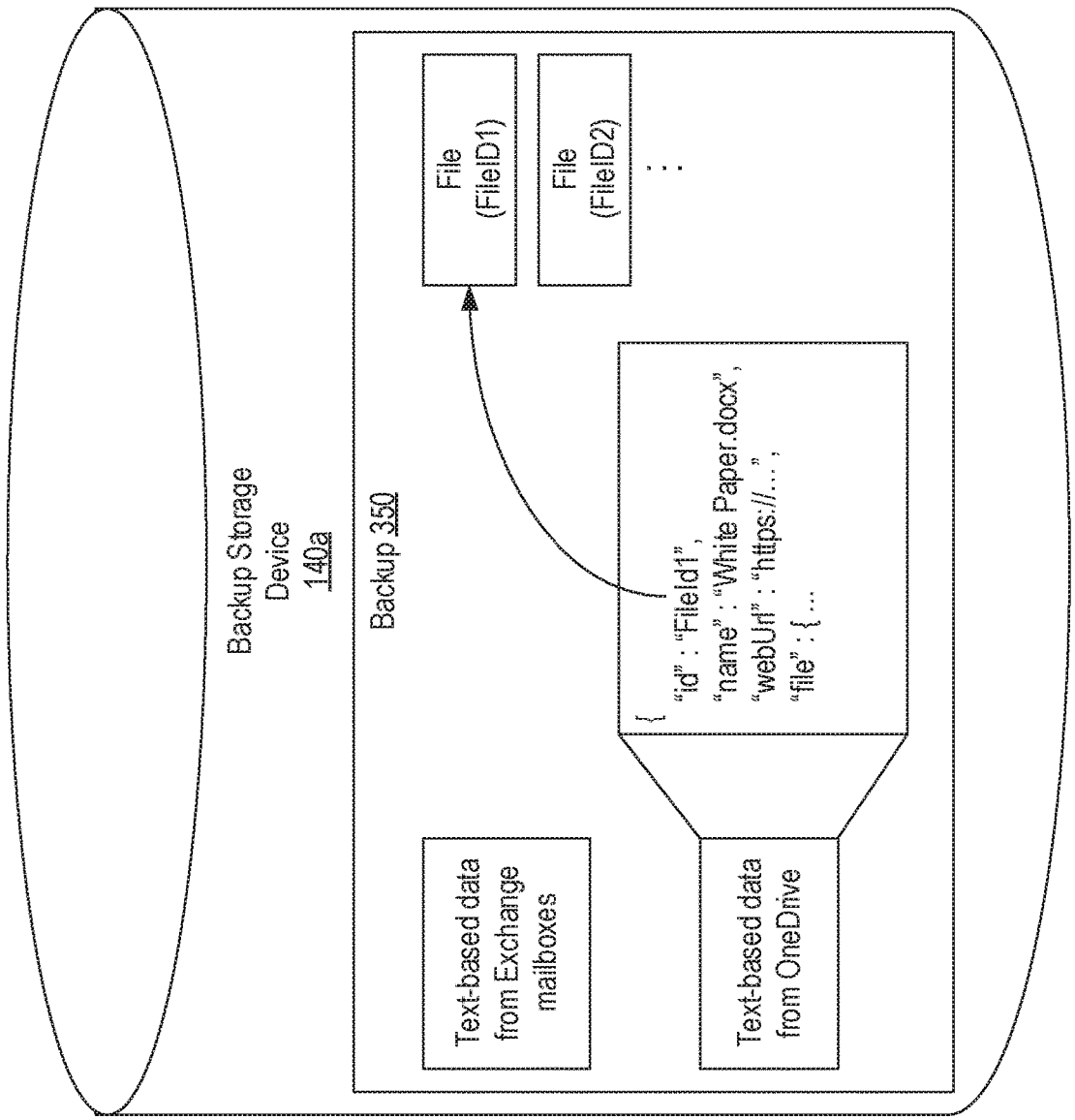

While or after receiving Graph API responses 305a and 305b, plug-in 121 can extract and backup this content as described below. FIG. 3D illustrates that plug-in 121 can relay the content of Graph API responses 305a and 305b to the appropriate device manager(s) 122 which in turn will write the content to backup storage device 140a. FIG. 3E provides more detail as to how this content can be stored as a backup 350. As shown, the text-based data that plug-in 121 receives from the Microsoft Graph API platform 112 can be stored on backup storage device 140a. In other words, the backup of the content of the cloud-based services can entail storing the text-based data of Graph API responses 305a and 305b in the same format (e.g., JSON) in which the content was provided in the responses.

Additionally, the files can also be stored on backup storage device 140a. Plug-in 121 can store these files in a manner that links them back to the text-based data. For example, FIG. 3E represents that a file can be named or otherwise associated with the file's identifier within the Microsoft Graph API platform 112. As described below, this can enable plug-in 121 to easily identify and restore the files to the proper location during a recovery.

Plug-in 121 can perform a similar process to restore a backup to one or more of cloud-based services 111. FIGS.

Figure 4A:
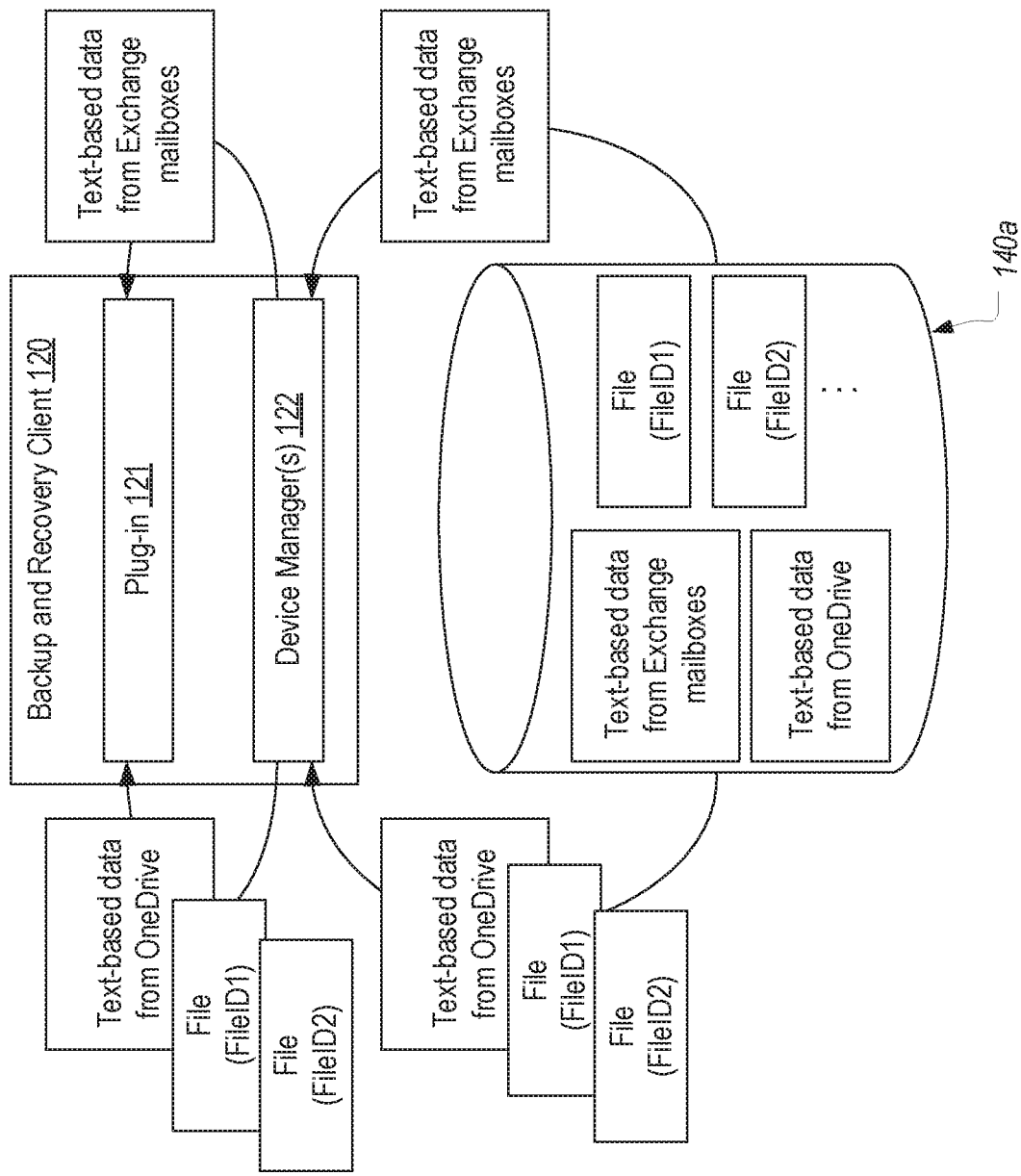
FIGS. 4A and 4B illustrate an example of how embodiments of the present invention can perform a recovery of a backup to diverse cloud-based services using the common backup and recovery solution.

4A-4B provide a simplified representation of how a recovery could be performed using backup 350. In FIG. 4A, it is assumed that the restoration of backup 350 has been requested. Accordingly, plug-in 121 can employ device manager(s) 122 to read the content of backup 350 from backup storage device 140a. As shown, this content includes both the text-based data and any files that were downloaded using information from the text-based data.

Figure 4B:
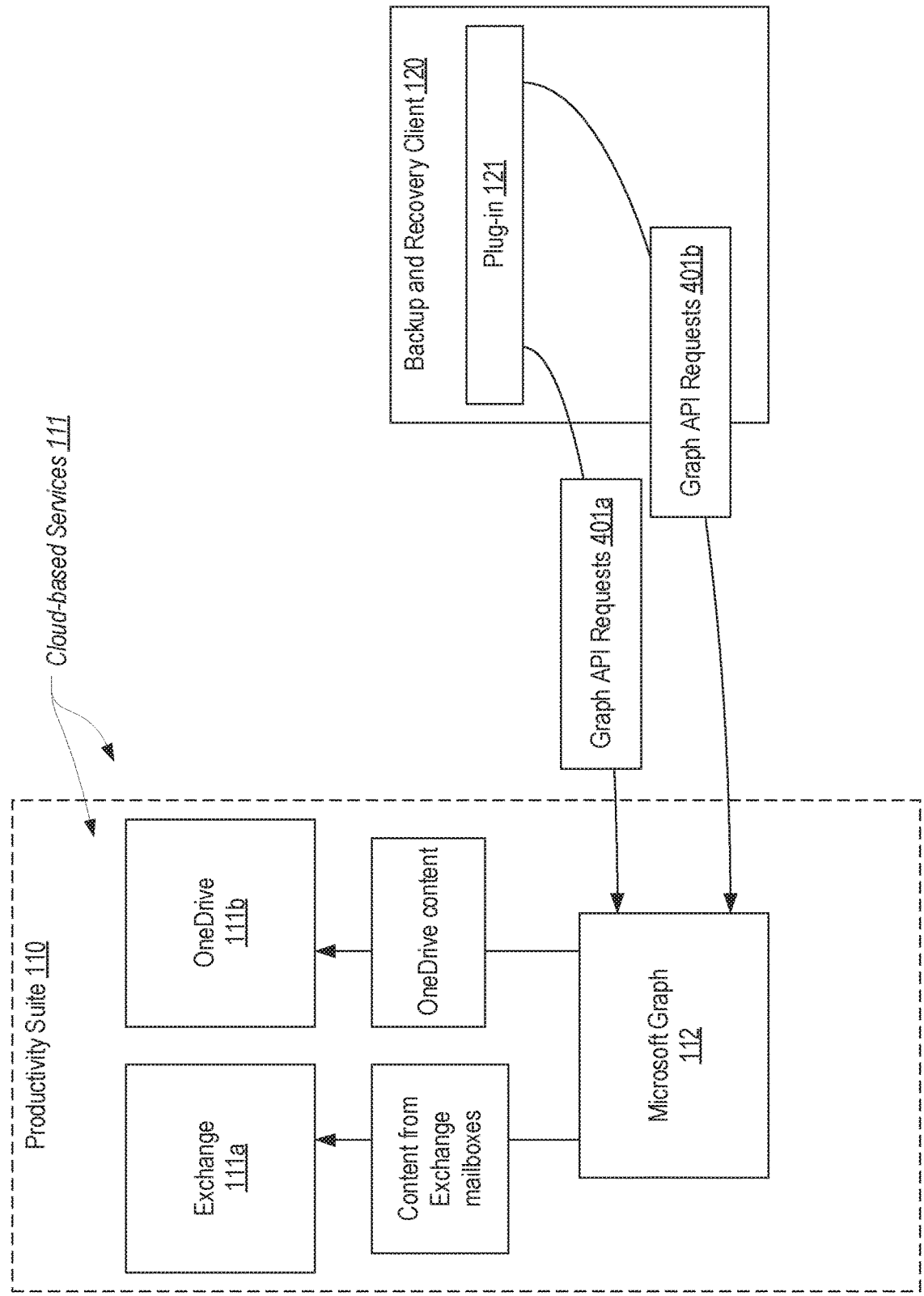

Turning to FIG. 4B, plug-in 121 is shown as building and transmitting Graph API requests 401a and 401b to cause the content of backup 350 to be restored into Exchange 111a and OneDrive 111b respectively. With regards to restoring emails to an Exchange mailbox, plug-in 121 may employ the text-based data of backup 350 to submit the following request to the Microsoft Graph API platform 112. This request will create the various emails within User A's inbox.

```
POST .../users/user_A@tenant.com/mailFolders/Inbox/messages
{
  "value" : [
    {
      "id" : "id1",
      "receivedDateTime": "2019-08-01T06:23:20Z",
      "has Attachments": false,
      "subject": "Project Overview",
      "body" : }
        "contentType" : "html",
        "content" : "<html ...",
      },
      "sender" : {
        "emailAddress" : {
          "address" : user_b@tenant.com"
        }
      }
    }
    {
      "id" : "id2",
      "receivedDateTime": "2019-08-02T09:11:50Z",
      "has Attachments": true,
      "subject": "Your Statement",
      "body" : {
        "contentType" : "html",
        "content" : "<html ...",
      }
      "sender" : {
        "emailAddress" : {
          "address" : billing@company.com"
        }
      }
    }
    ...
```

Attachments can be restored in a similar manner using the text-based data of backup 350. For example, the following request could be employed to restore an attachment to an email having an identifier of id2.

```
POST . . . /users/user_A@tenant.com/mailFolders/Inbox/
    messages/id2/attachments
{
  "value": [
    {
      "id": "AttachmentId1",
      "name": "Evaluation.docx",
      "contentType":  "application/vnd.openxmlfor-
          mats-officedocument.wordprocessingml.docu-
          ment",
      "contentBytes": "{bytestream}",
      . . .
```

In some embodiments, plug-in 121 may be configured to restore attachments to OneDrive as opposed to the message, event, post, etc. from which it originated. With reference to the example above, plug-in 121 could restore the attachment having an id of AttachmentId1 to User A's OneDrive account rather than restoring it as an attachment to the email having an id of id2. To do so, plug-in 121 may employ the following request.

```
PUT . . . /users/user_A@tenant.com/drive/items/root:/
    Evaluation.pdf:/content
{
(the binary stream of the Evaluation.pdf attachment)
. . .
```

In such cases, plug-in 121 may configure the Graph API request for restoring (or another Graph API request for updating) the corresponding message, event, post, etc. to include a key/value pair that provides a URL where the attachment can be accessed. As a result, when the user accesses the message, event, post, etc. within his or her Exchange account, a link may be provided to download the attachment. This restoration of attachments to OneDrive could be selectively performed when an attachment's size exceeds some threshold (e.g., 4 MB). In other instances, all attachments, attachments of a certain type, or attachments meeting some other criteria may be restored to OneDrive in this manner.

With regards to restoring files to OneDrive, plug-in 121 may employ the text-based data of backup 350 to identify each file in the backup and where the file should be restored. Plug-in 121 may then obtain each file from backup 350 (e.g., using the identifiers defined in the text-based data) and upload each file to the appropriate location in OneDrive. The following request represents how plug-in 121 may accomplish this. In this request, "parent-id" identifies a path to a folder (e.g., /drive/root:). The filename can be obtained from the name key shown above (e.g., White Paper.docx).

```
PUT . . . /users/{user-id}/drive/items/{parent-id}:/{file-
    name}:/content
{
(the binary stream of the file to be uploaded)
. . .
```

Plug-in 121 could employ a sequence of such requests to restore each file in backup 350 to the appropriate OneDrive folder.

Accordingly, Graph API requests 401a and 401b represent a common technique for restoring content to diverse cloud-based services 111 within productivity suite 110. This common technique for restoring backup 350 leverages the common technique that was originally employed to create the backup. In particular, because plug-in 121 stores the text-based data it receives in Graph API responses 305a and 305b as the content of the backup, plug-in 121 can build Graph API requests 401a and 401b directly from this text-based data to thereby provide a seamless recovery solution that is common to the diverse cloud-based services 111.

Once a backup is created, backup and recovery client 120 and/or backup and recovery server 130 can enable an administrator to browse the contents of the backup. For example, an administrator could employ application 141 to review the content of backup 350. Because backup 350 stores the text-based data which describes the emails, files, etc. in the backup, a browser can be employed to easily review the content of the backup (e.g., using JavaScript that consumes the JSON-formatted data). For example, application 141 can provide a user interface which lists each Exchange mailbox in backup 350 and allows the user to navigate to a particular user's mailbox to review the emails that it contains.

Figure 5:
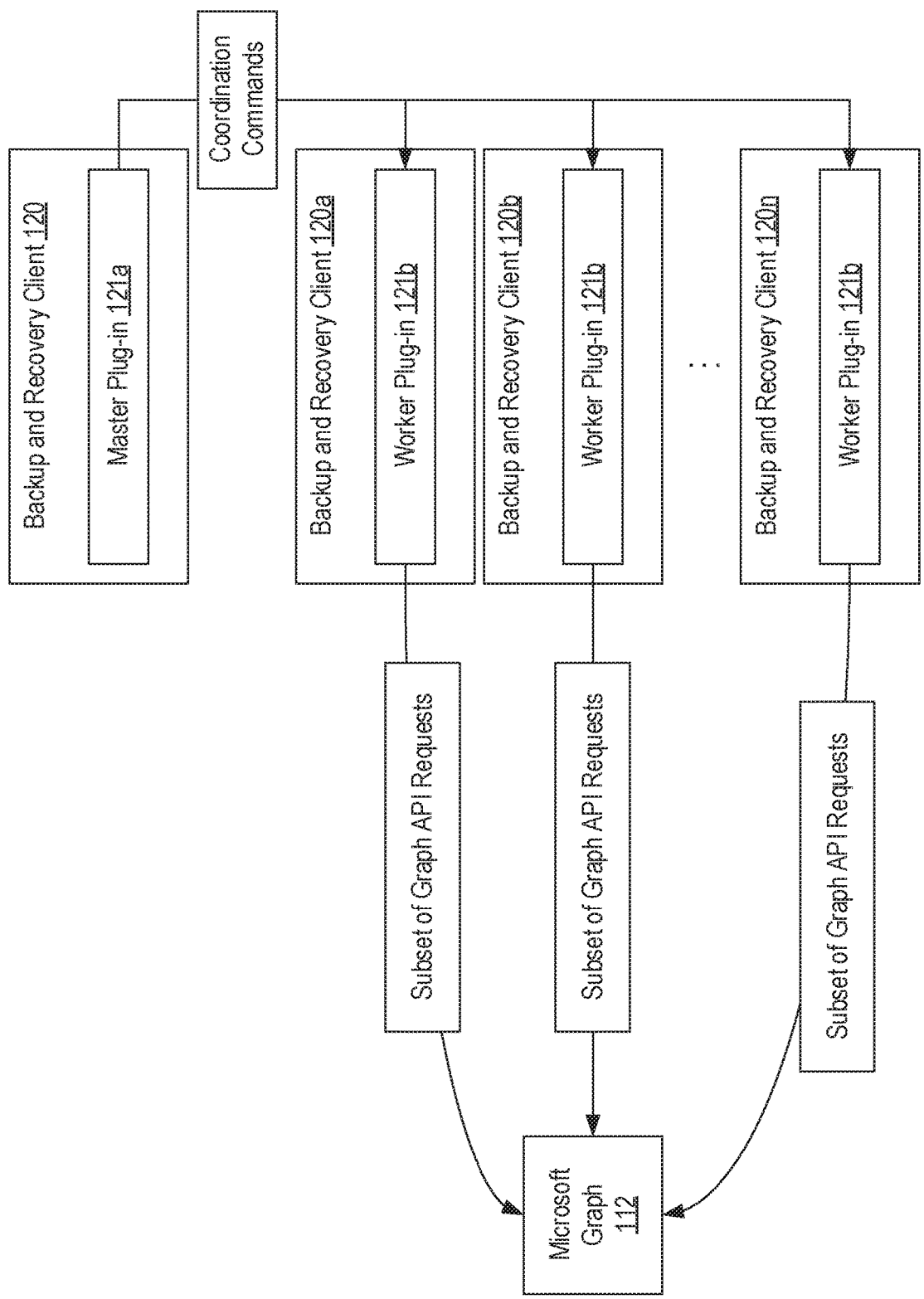
FIG. 5 illustrates how a backup or recovery can be performed using parallel streams.

In some embodiments, plug-in 121 could be configured to perform a backup or restore operation in parallel. For example, in FIG. 5, a master plug-in 121a exists on backup and recovery client 120. When a backup or recovery operation is to be performed, master plug-in 121a can coordinate with a number of worker plug-ins 121b that exist on other backup and recovery clients 120a-120n so that each worker plug-in 121b can build and submit a subset of the Graph API requests for accomplishing the operation. As an example, master plug-in 121a may cause a separate worker plug-in 121b to be employed to backup the contents of each user's Exchange mailbox or each user's OneDrive account. Although not shown, in the case of a backup, the resulting Graph API responses (including the content to be backed up) can be aggregated into backup 350.

In some embodiments, plug-in 121 (possibly in conjunction with other components on backup and recovery client 120) can perform an incremental backup. For example, after backup 350 has been created as described above, plug-in 121 could subsequently build and submit Graph API requests similar to Graph API requests 304a and 304b to retrieve the text-based data defining the contents of the tenant's users' Exchange accounts and OneDrive accounts. As a result, plug-in 121 will receive text-based data which defines the contents at that subsequent time. Rather than download files that are already included in backup 350, plug-in 121 can compare the text-based data retrieved at the subsequent time to the text-based data that already exists in backup 350 to identify any new files that should be backed up. Plug-in 121 could then proceed to build and submit Graph API requests for downloading only the files that were not already backed up.

In some embodiments, plug-in 121 can be configured to exclude attachments (whether to a message, event, post, etc.) from a backup. To accomplish this, plug-in 121 can build and submit Graph API requests for retrieving messages, events, posts, etc. from a user's Exchange mailbox as described above, but can simply forgo building and submitting Graph API requests for retrieving any attachments to such messages, events, posts, etc. In some embodiments, plug-in 121 may modify the corresponding text-based data to reflect that the attachments were not backed up.

In some embodiments, plug-in 121 may also be configured to backup and restore settings for a mailbox. For example, plug-in 121 may include the following request in Graph API requests 304a for each user having an Exchange account.

GET . . . /users/{user-id}/mailboxSettings

With such requests, Graph API responses 305a would include text-based data defining the mailbox settings of each user including, for example, automatic reply settings, language settings, time zone settings, etc. As a result, during a subsequent recovery operation, plug-in 121 can restore the settings to the users' mailboxes to their previous state using the same common technique for restoring the actual content to the mailboxes.

Figure 6:
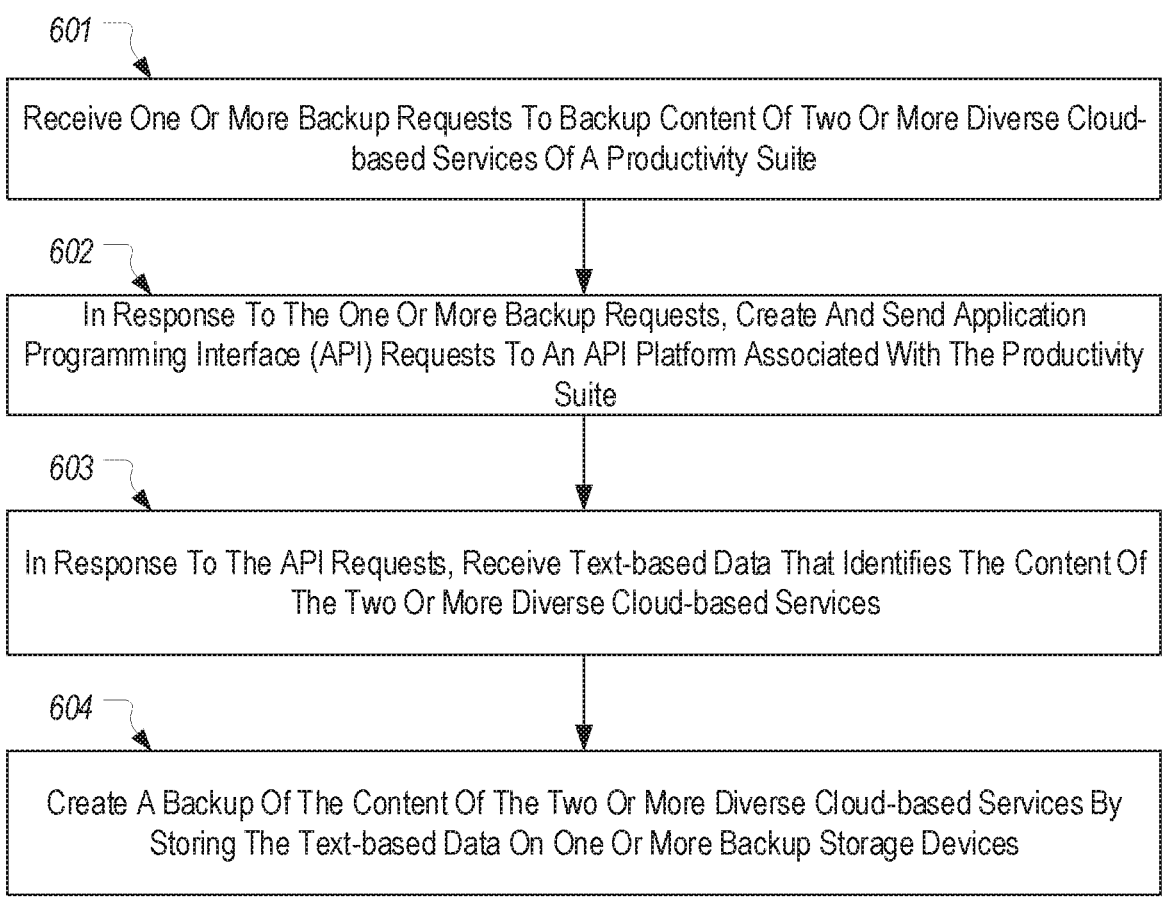
FIG. 6 provides a flowchart of an example method for performing a backup of content stored in diverse cloud-based services using a common technique.

FIG. 6 provides a flowchart of an example method 600 for performing a backup of content stored in diverse cloud-based services using a common technique. As an example, method 600 can be implemented by plug-in 121 in conjunction with other components of a backup solution.

Method 600 includes an act 601 of receiving one or more backup requests to backup content of two or more diverse cloud-based services of a productivity suite. For example, plug-in 121 could receive jobs 302a and 302b which indicate that content from a tenant's users' Exchange mailboxes and OneDrive accounts should be backed up.

Method 600 includes an act 602 of, in response to the one or more backup requests, creating and sending API requests to an API platform associated with the productivity suite. For example, plug-in 121 could send Graph API requests 304a and 304b to the Microsoft Graph API platform 112.

Method 600 includes an act 603 of, in response to the API requests, receiving text-based data that identifies the content of the two or more diverse cloud-based services. For example, plug-in 121 could receive Graph API responses 305a and 305b which include JSON-formatted data identifying the emails and other content in the tenant's users' Exchange mailboxes and folders and files stored in the tenant's users' OneDrive accounts.

Method 600 includes an act 604 of creating a backup of the content of the two or more diverse cloud-based services by storing the text-based data on one or more backup storage devices. For example, plug-in 121 could cause the JSON-formatted data contained in Graph API responses 305a and 305b to be stored on backup storage device 140a as part of backup 350.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for performing a backup of content stored in diverse cloud-based services using a common technique, the method comprising:
receiving one or more backup requests to backup content of two or more diverse cloud-based services of a productivity suite, the two or more diverse cloud-based services including a hosted email platform of the productivity suite and at least one other cloud-based service of the productivity suite;
in response to the one or more backup requests, creating and sending application programming interface (API) requests to an API platform associated with the productivity suite;
in response to the API requests, receiving text-based data that identifies the content of the two or more diverse cloud-based services; and
creating a backup of the content of the two or more diverse cloud-based services by storing the text-based data on one or more backup storage devices.

2. The method of claim 1, wherein the API platform is the Microsoft Graph API platform.

3. The method of claim 1, wherein the text-based data identifies emails that are stored in mailboxes in the hosted email platform.

4. The method of claim 3, wherein at least one of the emails includes one or more attachments such that the text-based data identifies the one or more attachments and includes content of the one or more attachments.

5. The method of claim 1, wherein the at least one other cloud-based service of the productivity suite includes a hosted storage platform such that the text-based data identifies files that are stored in the hosted storage platform.

6. The method of claim 5, further comprising:
employing information defined in the text-based data to obtain the files identified in the text-based data;
wherein, creating the backup includes storing the obtained files with the text-based data on the one or more backup storage devices.

7. The method of claim 1, wherein the at least one other cloud-based service of the productivity suite includes a hosted collaboration platform.

8. The method of claim 1, wherein the at least one other cloud-based service of the productivity suite includes a hosted personal information manager.

9. The method of claim 1, further comprising:
receiving one or more recovery requests to restore the backup;
in response to the one or more recovery requests, accessing the text-based data from the backup;
creating and sending additional API requests to the API platform, the additional API requests including at least some of the text-based data from the backup to thereby cause the API platform to restore at least some of the content to at least one of the two or more diverse cloud-based services.

10. The method of claim 9, wherein the text-based data identifies emails that are stored in mailboxes in the hosted email platform, and wherein the at least some of the text-based data that is included in the additional API requests identifies the emails.

11. The method of claim 10, wherein the at least one other cloud-based service of the productivity suite least one includes a hosted storage platform and wherein the text-based data identifies that at least one of the emails includes one or more attachments, the method further comprising:
creating and sending separate additional API requests to the API platform, the separate additional API requests causing the one or more attachments of the at least one of the emails to be stored as corresponding one or more files in the hosted storage platform rather than restoring the one or more attachments of the at least one of the emails to the hosted email platform.

12. The method of claim 11, wherein the one or more attachments of the at least one of the emails are stored as corresponding one or more files in the hosted storage platform when the one or more attachments have a size exceeded a threshold.

13. The method of claim 1, wherein the text-based data identifies settings of one or more mailboxes in a hosted email platform.

14. The method of claim 1, wherein the text-based data comprises JavaScript Object Notation (JSON) formatted data.

15. One or more computer storage media storing computer executable instructions which when executed implement a backup and recovery solution that is configured to perform a method for creating a backup of content stored in diverse cloud-based services using a common technique, the method comprising:
receiving one or more backup requests to backup content of a cloud-based hosted email platform of a productivity suite and content of a cloud-based storage platform of the productivity suite;
creating and sending a first set of application programming interface (API) requests to an API platform of the productivity suite, the first set of API requests being configured to retrieve emails from the cloud-based hosted email platform;
creating and sending a second set of API requests to the API platform, the second set of API requests being configured to retrieve files from the cloud-based storage platform;
in response to the first set of API requests, receiving a first set of text-based data that identifies the emails;
in response to the second set of API requests, receiving a second set of text-based data that identifies the files;
employing the second set of text-based data to obtain the files; and
creating a backup by storing the first set of text-based data, the second set of text-based data and the files on one or more backup storage devices.

16. The computer storage media of claim 15, wherein the second set of text-based data includes an identifier for each of the files, and wherein each file is stored in association with the corresponding identifier.

17. The computer storage media of claim 15, wherein the method further comprises:
receiving one or more recovery requests to restore the backup;
accessing the first set of text-based data from the backup;
creating and sending a third set of API requests to the API platform, the third set of API requests including at least a portion of the first set of text-based data to thereby cause at least some of the emails to be restored to the cloud-based hosted email platform; and
creating and sending a fourth set of API requests to the API platform, the fourth set of API requests including at least a portion of the second set of text-based data and content of at least some of the files to thereby cause at least some of the files to be restored to the cloud-based hosted storage platform.

18. The computer storage media of claim 17, wherein the first set of text-based data includes content of one or more email attachments, wherein the method further comprises:

creating and sending a fifth set of API requests to the API platform, the fifth set of API requests including the content of the one or more email attachments and being configured to cause corresponding one or more files to be created in the cloud-based hosted storage platform.

19. A method for performing a backup of content stored in diverse cloud-based services using a common technique, the method comprising:

in response to determining that a backup of content of two or more diverse cloud-based services of a productivity suite should be performed, creating and sending a first set of application programming interface (API) requests to an API platform associated with the productivity suite, the two or more diverse cloud-based services including a hosted email platform of the productivity suite and at least one other cloud-based service of the productivity suite;

in response to sending the first set of API requests, receiving a set of text-based data that identifies the content of the two or more diverse cloud-based services;

employing information contained in the set of text-based data to obtain files that are maintained by at least one of the two or more diverse cloud-based services; and creating a backup of the content of the two or more diverse cloud-based services by storing the set of text-based data and the files on one or more backup storage devices.

20. The method of claim 19, further comprising:

in response to determining that the backup should be restored, accessing the set of text-based data and the files on the one or more backup storage devices;

creating and sending a second set of API requests to the API platform, the second set of API requests including at least a portion of the set of text-based data and content of at least some of the files to thereby cause at least a portion of the content of the two or more diverse cloud-based services to be restored.

* * * * *